United States Patent
Sorrentino

(10) Patent No.: US 9,838,987 B2
(45) Date of Patent: Dec. 5, 2017

(54) FORMATTING FOR D2D SYNCHRONIZATION SIGNALS

(71) Applicant: Telefonaktiebolaget L M Ericsson (publ), Stockholm (SE)

(72) Inventor: Stefano Sorrentino, Solna (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 4 days.

(21) Appl. No.: 14/893,119

(22) PCT Filed: Aug. 18, 2015

(86) PCT No.: PCT/SE2015/050876
§ 371 (c)(1),
(2) Date: Nov. 23, 2015

(87) PCT Pub. No.: WO2016/028206
PCT Pub. Date: Feb. 25, 2016

(65) Prior Publication Data
US 2016/0295533 A1 Oct. 6, 2016

Related U.S. Application Data

(60) Provisional application No. 62/040,730, filed on Aug. 22, 2014.

(51) Int. Cl.
*H04B 7/00* (2006.01)
*H04B 15/00* (2006.01)
(Continued)

(52) U.S. Cl.
CPC ......... *H04W 56/001* (2013.01); *H04W 4/008* (2013.01); *H04W 76/023* (2013.01)

(58) Field of Classification Search
CPC ............... H04W 8/005; H04W 56/001; H04W 56/0025; H04W 76/023; H04W 48/18; H04W 56/0015
(Continued)

(56) References Cited

U.S. PATENT DOCUMENTS

2014/0323126 A1* 10/2014 Ro ..................... H04W 8/005
455/434
2015/0215763 A1* 7/2015 Ro ..................... H04W 8/005
455/426.1
(Continued)

FOREIGN PATENT DOCUMENTS

WO   WO 2014/089252 A1   6/2014

OTHER PUBLICATIONS

Qualcomm Incorporated "Signal Design for D2D Synchronization", 3GPP TSG-RAN WG1 Meeting #76, R1-140462, Prague, Czech Republic, Feb. 10-14, 2014, 7 Pages.
(Continued)

*Primary Examiner* — Nhan Le
(74) *Attorney, Agent, or Firm* — Sage Patent Group

(57) ABSTRACT

A method may be provided for a device to device (D2D) transmitter to distinguish between different D2D synchronization signals, D2DSSs. The method may include transmitting a device to device synchronization signal (D2DSS) for a first service to a D2D receiver; and associating a first set of D2DSS physical layer parameters to the D2DSS for the first service. A second set of D2DSS physical layer parameters are associated to a D2DSS for a second service so that the D2DSS for the first service is distinguishable from the D2DSS for the second service.

26 Claims, 11 Drawing Sheets

(51) Int. Cl.
*H04W 56/00* (2009.01)
*H04W 4/00* (2009.01)
*H04W 76/02* (2009.01)

(58) Field of Classification Search
USPC ....... 455/418–420, 422.1, 431.1, 435.1, 500, 455/502, 550.1, 552.1
See application file for complete search history.

(56) References Cited

U.S. PATENT DOCUMENTS

| | | | | |
|---|---|---|---|---|
| 2016/0021625 A1* | 1/2016 | Li | .................... | H04W 72/1289 370/336 |
| 2016/0021626 A1* | 1/2016 | Abedini | .............. | H04W 56/002 370/328 |
| 2016/0029331 A1* | 1/2016 | Seo | .................... | H04W 56/002 370/350 |
| 2016/0135121 A1* | 5/2016 | Takano | ............... | H04W 76/023 370/336 |

OTHER PUBLICATIONS

International Search Report and Written Opinion Corresponding to International Application No. PCT/SE2015/050876; dated Nov. 23, 2015; 12 Pages.
CATT, "Design of D2DSS and PD2DSCH", 3GPP TSG RAN WG1 Meeting #78, Dresden, Germany, Aug. 18-22, 2014, R1-142893, 5 Pages.
Ericsson, "Synchronization Signals and Channel Design for D2D Discovery and Communication", 3GPP TSG RAN WG1 Meeting #76, Prague, Czech Republic, Feb. 10-14, 2014, R1-140774, 7 Pages.

* cited by examiner

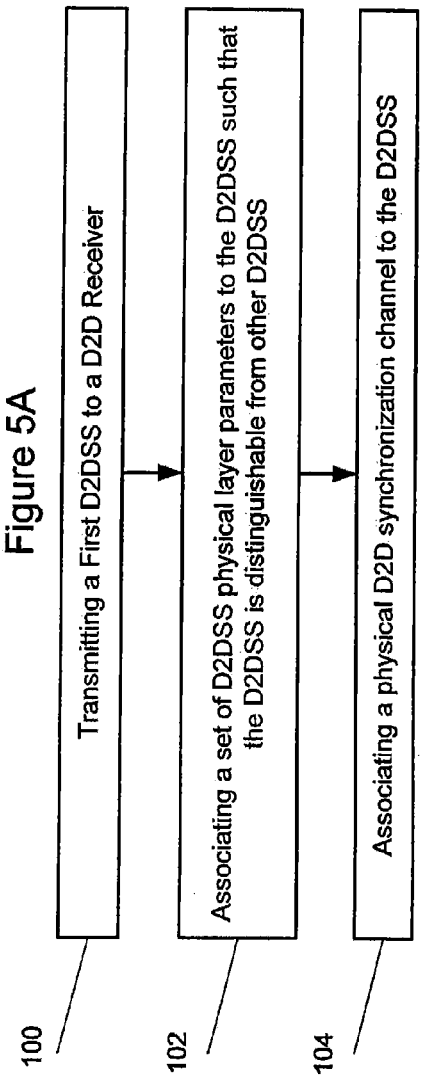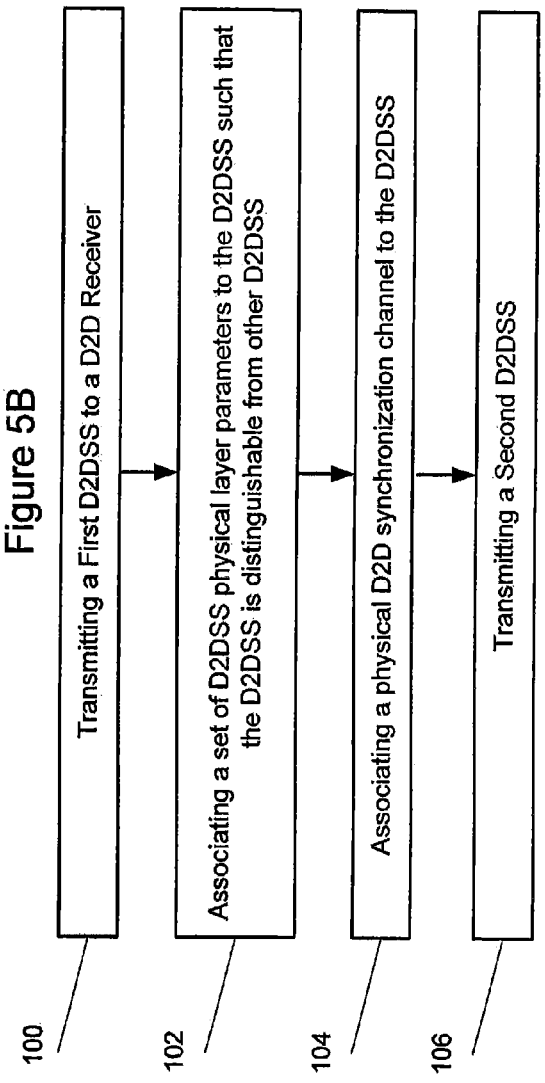

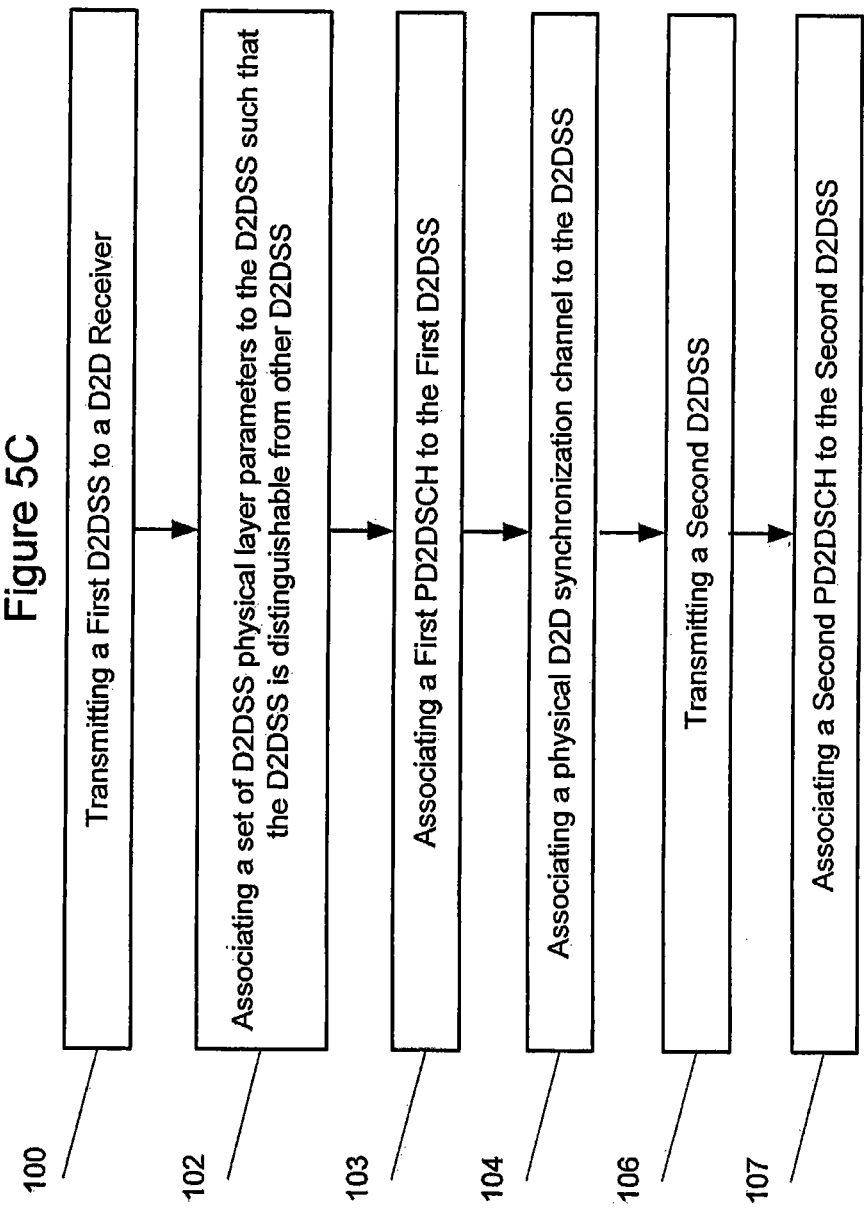

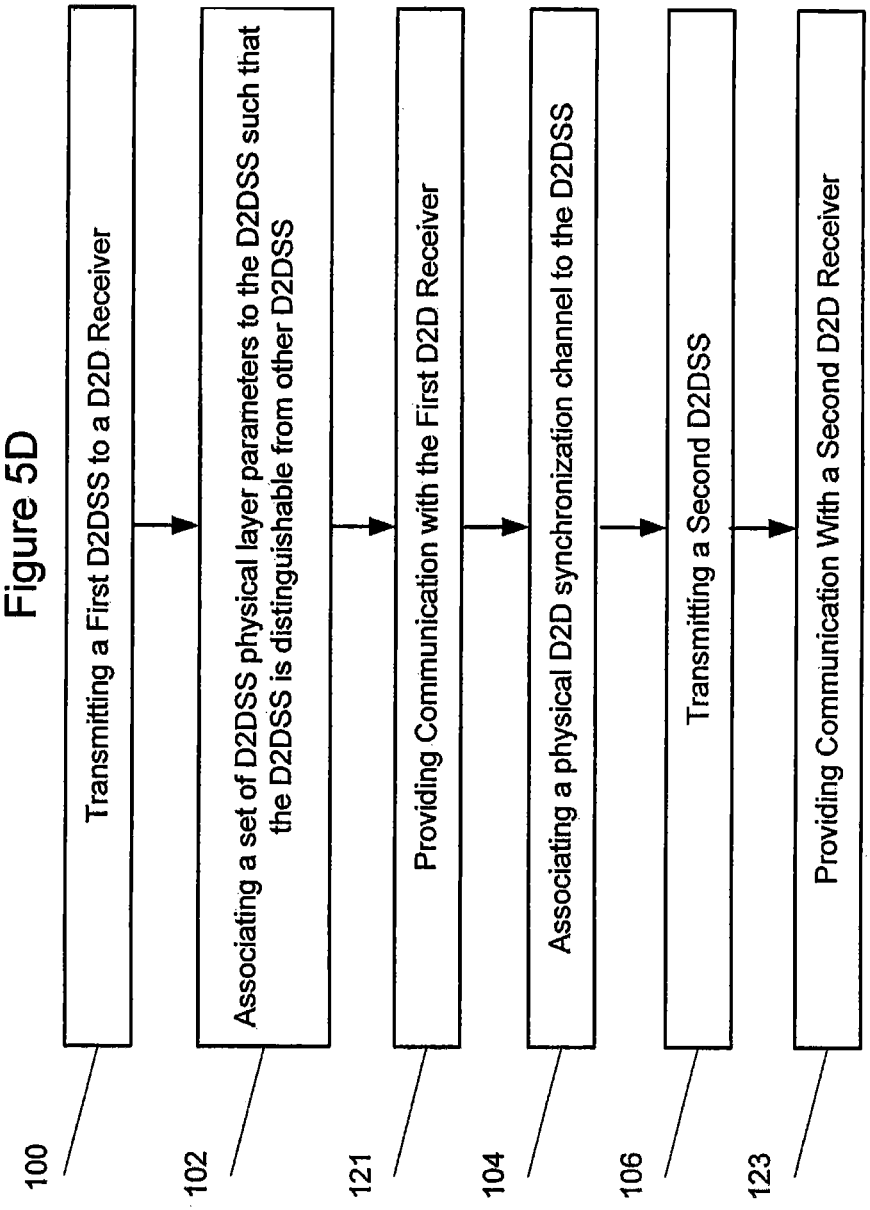

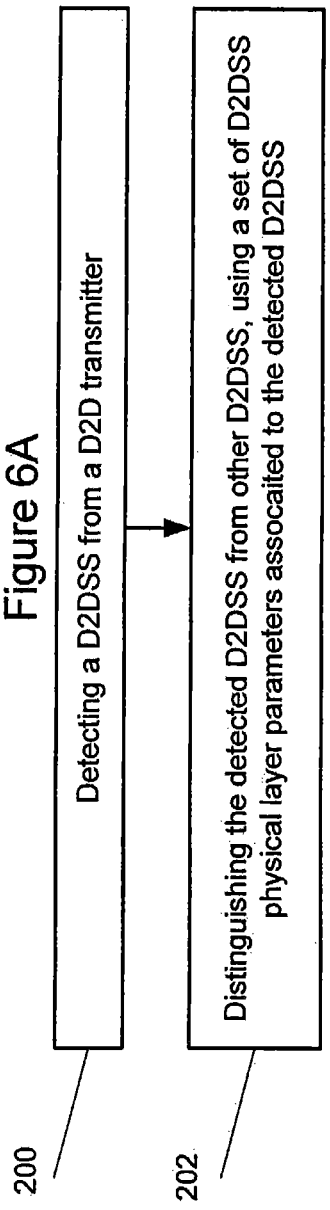
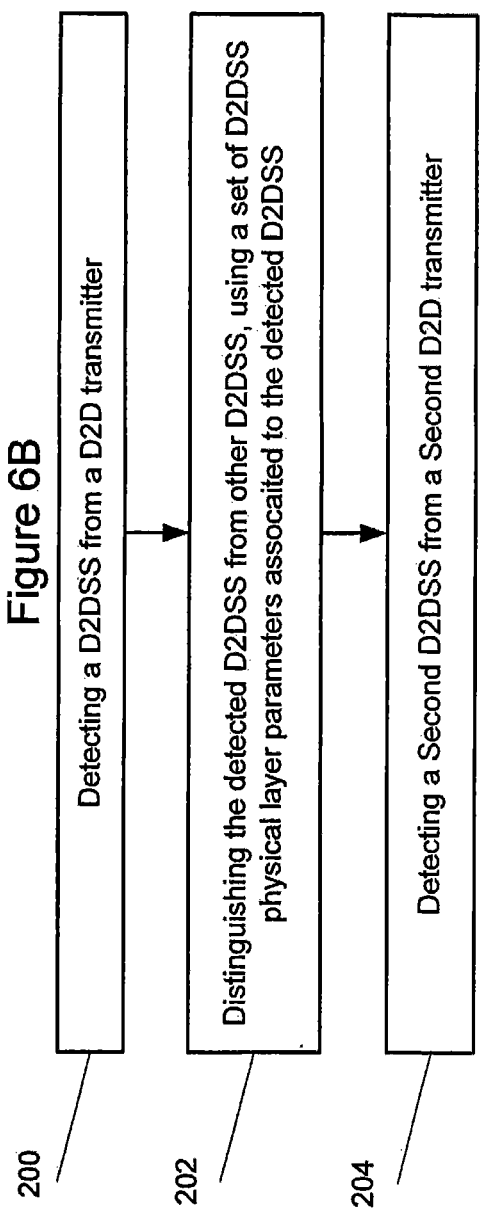

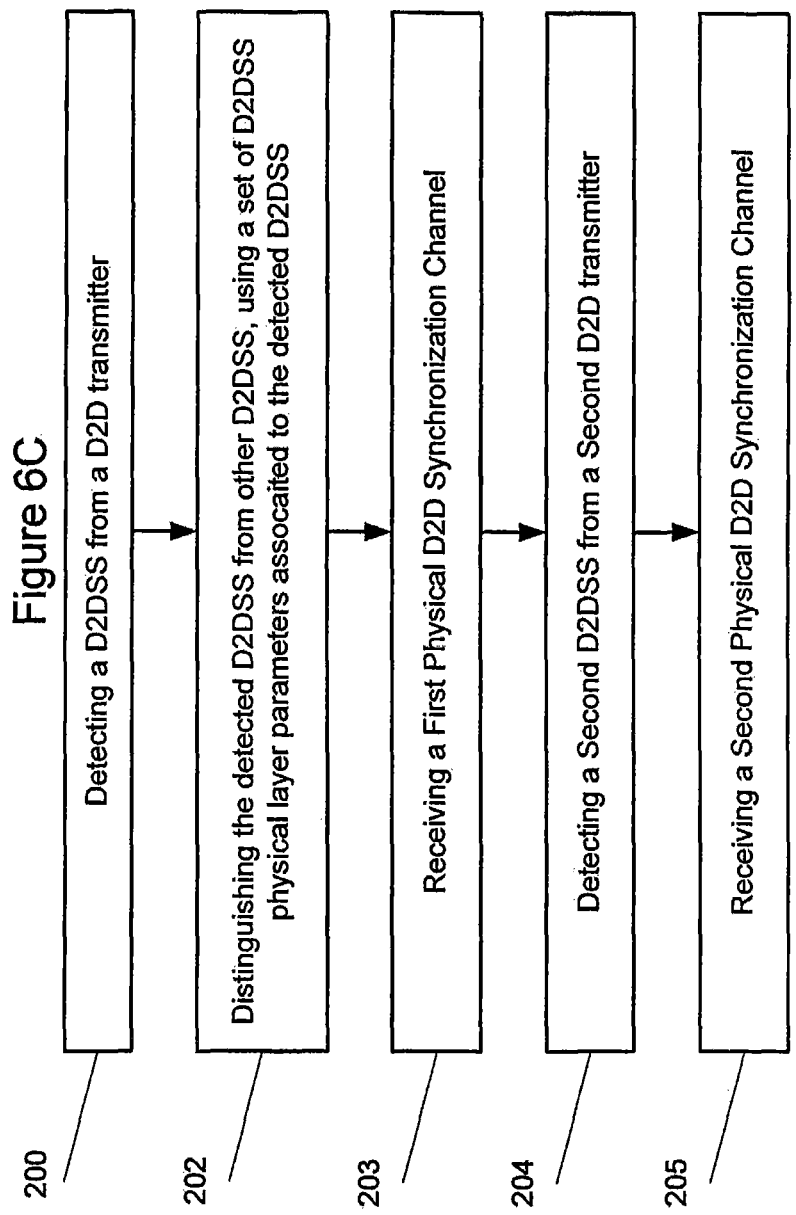

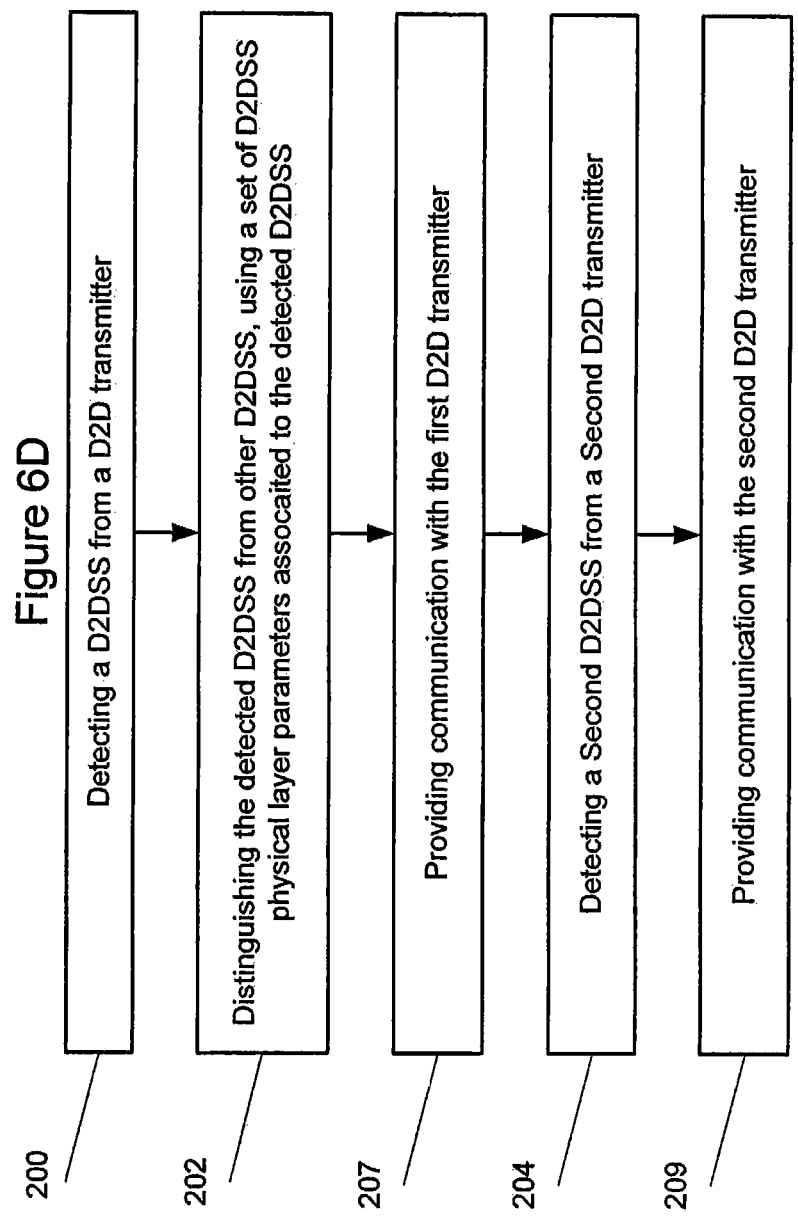

FORMATTING FOR D2D SYNCHRONIZATION SIGNALS

CROSS REFERENCE TO RELATED APPLICATIONS

This application is a 35 U.S.C. §371 national stage application of PCT International Application No. PCT/SE2015/050876, filed on Aug. 18, 2015, which itself claims priority to U.S. provisional Application No. 62/040,730, filed Aug. 22, 2014, the disclosure and content of both of which are incorporated by reference herein in their entirety.

TECHNICAL FIELD

The present disclosure is directed to D2D communications and, more particularly, to methods for D2D receivers and D2D transmitters for distinguishing D2D synchronization signals.

BACKGROUND

In Device-to-Device (D2D) communication, the source and the target are wireless devices, e.g., User Equipments (UEs). Some of the potential advantages are off-loading of the cellular network, faster communication, increased awareness of surrounding wireless devices of interest (e.g., running the same application), higher-quality links due to a shorter distance, etc. Some appealing applications of D2D communications are video streaming, online gaming, media downloading, Peer-to-Peer (P2P), file sharing, etc.

Traditional communication in terrestrial radio networks is via links between UEs and base stations (eNB). However, when two UEs are in the vicinity of each other, then direct device to device (D2D) communication could be considered. Such communication may be dependent on synchronization information from either a base station or a different node such as a cluster head (CH) (a UE acting as synchronization source) providing local synchronization information, or a UE enabled to relay synchronization information from a different synchronization source. The synchronization source SS-eNB from eNB (shown with solid lines) and/or the synchronization source SS-CH from a cluster head CH (shown with dot-dash lines) may be used for intra-cell/cluster communication. The relayed synchronization signal is used for inter-cell/cluster communication. An illustration of synchronization sources from different nodes is shown in FIG. 1.

For in-coverage D2D scenarios, the synchronization reference is provided by the base station eNB, and the D2D resource pool is signaled by the base station eNB to indicate the resource used for D2D. For out of coverage D2D scenarios, the synchronization reference is provided by a cluster head CH.

The signal design of D2DSS (device to device synchronization signal) is under discussion in 3GPP. In current working assumption, D2DSS comprises at least a PD2DSS (primary D2DSS) and may also comprise a SD2DSS (secondary D2DSS). Based on the working assumption, PD2DSS and SD2DSS use a Zadoff-Chu sequence and an M sequence, which are similar to the LTE PSS (primary synchronization signal) and SSS (secondary synchronization signal) respectively. Therefore, it may be advantageous to reuse the LTE PSS and SSS format for the D2DSS as much as possible to reuse the existing timing acquisition circuit to the maximum extent.

So far, 3GPP/RAN1 has assumed common D2D synchronization signals (D2DSS) to support discovery and communication. However, communication may require tighter D2DSS periodicity than discovery, and the above assumption may result in unnecessarily large energy consumption for the purpose of transmitting and/or reading D2DSS for UEs that are only interested in discovery.

If the D2DSS transmission periodicity is decoupled for UEs performing discovery and communication, respectively, there can be confusion for receivers which will receive multiple signals all suitable for synchronization and D2DSS-related measurements, creating a potentially unstable and unpredictable synchronization protocol.

SUMMARY

According to some embodiments of present inventive concepts, a method may be provided for a device to device (D2D) transmitter to distinguish between different D2D synchronization signals (D2DSSs). The method may include transmitting a device to device synchronization signal (D2DSS) for a first service to a D2D receiver. In addition, a first set of D2DSS physical layer parameters may be associated to the D2DSS for the first service. Moreover, a second set of D2DSS physical layer parameters may be associated to a D2DSS for a second service so that the D2DSS for the first service is distinguishable from the D2DSS for the second service. For example, the D2DSS for the first service may be a D2DSS for discovery support (D2DSS_d), and the D2DSS for the second service may be a D2DSS for communication support (D2DSS_c).

By distinguishing D2D synchronization signals used for a first service (e.g., discovery support) from D2D synchronization signals used for a second service (e.g., communication support), transmission/reception/processing of D2D synchronization signals may be improved based on application thereby reducing energy consumption and/or processing overhead.

Associating a first set of D2DSS physical layer parameters to the D2DSS for the first service may include associating a first D2D sequence to the D2DSS for the first service, and the second set of D2DSS physical layer parameters may include a second D2D sequence associated to the D2DSS for the second service.

Associating a first set of D2DSS physical layer parameters to the D2DSS for the first service may include associating a first D2DSS mapping in the frequency domain to the D2DSS for the first service, and the second set of D2DSS physical layer parameters may include a second D2DSS mapping in the frequency domain associated to the D2DSS for the second service.

Associating a first set of D2DSS physical layer parameters to the D2DSS for the first service may include associating a first D2DSS time mapping of symbols to the D2DSS for the first service, and the second set of D2DSS physical layer parameters may include a second D2DSS time mapping of symbols associated to the D2DSS for the second service.

Associating a first set of D2DSS physical layer parameters to the D2DSS for the first service may include associating a first synchronization identity to the D2DSS for the first service, and the second set of D2DSS physical layer parameters may include a second synchronization identity associated to the D2DSS for the second service.

In addition, a physical D2D synchronization channel (PD2DSCH) may be associated to the D2DSS for the first service such that the D2DSS for the first service is distinguishable from the D2DSS for the second service. The PD2DSCH associated to the D2DSS for the first service may include a physical D2D synchronization channel for discovery (PD2DSCH_d), and a physical D2D synchronization channel for communication (PD2DSCH_c) may be associated to the D2DSS for the second service.

Transmitting the D2DSS may include transmitting a first D2DSS that is a D2DSS for the first service. In addition, a second D2DSS that is a D2DSS for the second service may be transmitted to a D2D receiver such that the first D2DSS that is a D2DSS for the first service is distinguishable from the second D2DSS that is a D2DSS for the second service. Moreover, the first and second D2DSSs may have different mappings in the frequency domain, different time mappings, different synchronization identities; and/or different D2D sequences.

A first physical D2D synchronization channel (PD2DSCH) may be associated to the first D2DSS for the first service, and a second physical D2D synchronization channel (PD2DSCH) may be associated to the second D2DSS for the second service.

Communication with a first D2D receiver may be provided based on the first D2DSS for the first service, and communication with a second D2D receiver may be provided based on the second D2DSS for the second service.

The first service may include discovery support, and the second service may include communication support.

Transmitting the D2DSS for the first service may include transmitting the D2DSS to enable D2D operation in support of the first service. The D2DSS for the second service may be configured to enable D2D operation in support of the second service.

According to some other embodiments of present inventive concepts, a method may be provided for a device to device (D2D) receiver to distinguish between different D2D synchronization signals (D2DSSs). The method may include detecting a D2DSS for a first service from a D2D transmitter. In addition, the detected D2DSS for the first service may be distinguished from a D2DSS for a second service using a first set of D2DSS physical layer parameters associated to the detected D2DSS for the first service. Moreover, a second set of D2DSS physical layer parameters may be associated to the D2DSS for the second service so that the D2DSS for the first service is distinguished from the D2DSS for the second service.

The D2DSS for the first service may be a D2DSS for discovery support (D2DSS_d), and the D2DSS for the second service may be a D2DSS for communication support (D2DSS_c). Detecting a D2DSS from a D2D transmitter may further include searching for a D2DSS from a D2D transmitter, and measuring signal characteristics of the D2DSS from the D2D transmitter. Measuring signal characteristics of the D2DSS from the D2D transmitter may include measuring D2D sequences and/or D2DSS mappings in the frequency domain and/or D2DSS time mappings of symbols and/or synchronization identities.

The D2D transmitter may be a first D2D transmitter, and detecting the D2DSS for the first service may include detecting a first D2DSS from the first D2D transmitter that is a D2DSS for the first service. In addition, a second D2DSS that is a D2DSS for the second service from a second D2D transmitter may be detected such that the first D2DSS for the first service is distinguishable from the second D2DSS for the second service.

The first and second D2DSSs may have different mappings in the frequency domain, different time mappings, different synchronization identities, and/or different D2D sequences.

A first physical D2D synchronization channel (PD2DSCH) may be received from the first D2D transmitter wherein the first physical D2D synchronization channel is associated with the first D2DSS for the first service. A second physical D2D synchronization channel (PD2DSCH) may be received from the second D2D transmitter, wherein the second physical D2D synchronization channel is associated with the second D2DSS for the second service.

Communication with the first D2D transmitter may be provided based on the first D2DSS for the first service, and communication with the second D2D transmitter may be provided based on the second D2DSS for the second service.

The first service may include discovery support, and the second service may include communication support.

The D2DSS for the first service may be configured to enable D2D operation in support of the first service. Moreover, the D2DSS for the second service may be configured to enable D2D operation in support of the second service.

According to still other embodiments, a device to device (D2D) transmitter may be configured to transmit a device to device synchronization signal (D2DSS) for a first service to a D2D receiver. The D2D transmitter may be further configured to associate a first set of D2DSS physical layer parameters to the D2DSS for the first service. Moreover, a second set of D2DSS physical layer parameters may be associated to a D2DSS for a second service so that the D2DSS for the first service is distinguishable from the D2DSS for the second service.

According to yet other embodiments, a device to device (D2D) transmitter may include a processor configured to transmit a device to device synchronization signal (D2DSS) for a first service to a D2D receiver. The processor may be further configured to associate a first set of D2DSS physical layer parameters to the D2DSS for the first service, and a second set of D2DSS physical layer parameters may be associated to a D2DSS for a second service so that the D2DSS for the first service may be distinguishable from the D2DSS for the second service.

According to more embodiments of present inventive concepts, a device to device (D2D) receiver may be configured to detect a D2DSS for a first service from a D2D transmitter. The D2D receiver may be further configured to distinguish the detected D2DSS for the first service from a D2DSS for a second service using a first set of D2DSS physical layer parameters associated to the detected D2DSS for the first service. Moreover a second set of D2DSS physical layer parameters may be associated to the D2DSS for the second service so that the D2DSS for the first service is distinguished from the D2DSS for the second service.

According to still more embodiments of present inventive concepts, a device to device (D2D) receiver may include a processor configured to detect a D2DSS for a first service from a D2D transmitter. The processor may be further configured to distinguish the detected D2DSS for the first service from a D2DSS for a second service using a first set of D2DSS physical layer parameters associated to the detected D2DSS for the first service. Moreover, a second set of D2DSS parameters may be associated to the D2DSS for the second service so that the D2DSS for the first service is distinguished from the D2DSS for the second service.

BRIEF DESCRIPTION OF THE DRAWINGS

The accompanying drawings, which are included to provide a further understanding of the disclosure and are incorporated in and constitute a part of this application, illustrate certain non-limiting embodiment(s) of inventive concepts. In the drawings:

FIGS. 5A-D, 6A-D, and 7 are flowcharts illustrating operations and/or methods that are performed by a D2D transmitter and/or by the D2D receiver according to some embodiments of present inventive concepts.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

Various present embodiments disclosed herein may overcome one or more of the potential problems explained above with some previously known approaches.

Various embodiments are disclosed in the context of electronic communication devices (referred to as devices for brevity) that can communicate with each other using D2D and can communicate with a radio network node (e.g., eNB). Non-limiting example devices can include user equipment (UE), devices capable of machine to machine (M2M) communication, PDAs (personal digital assistants), tablet computers (e.g., iPads), mobile terminals, smart phones, laptop embedded equipped (LEE) devices, laptop mounted equipment (LME), USB dongles, etc.

Various embodiments disclosed herein are directed to operations and methods performed for device-to-device (D2D) transmission by a transmitting device (transmitter) to a receiving device (receiver).

According to some embodiments, methods for a D2D receiver and methods for a D2D transmitter may distinguish between a D2DSS transmitted for the purpose of discovery support, D2DSS_d, and a D2DSS transmitted for the purpose of communication support, D2DSS_c. While different periodicity for discovery and communication D2DSS is not precluded by these embodiments, the means mentioned above may include additional aspects such as restriction of the D2DSS sequences allowed for D2DSS for respectively communication and discovery or any other physical layer property that enables detection of the service associated to a certain D2DSS.

These embodiments may enable improvement/optimization of D2D synchronization signals based on their application. This may provide advantages in terms energy savings, and reduced overhead.

With Primary Synchronization Signal (PSS)/Secondary Synchronization Signal (SSS) of LTE, LTE cell search includes the following basic parts:

Acquisition of frequency and symbol synchronization to a cell;

Acquisition of frame timing of the cell—that is, determine the start of the downlink frame; and Determination of the physical-layer cell identity of the cell.

Figure 1:
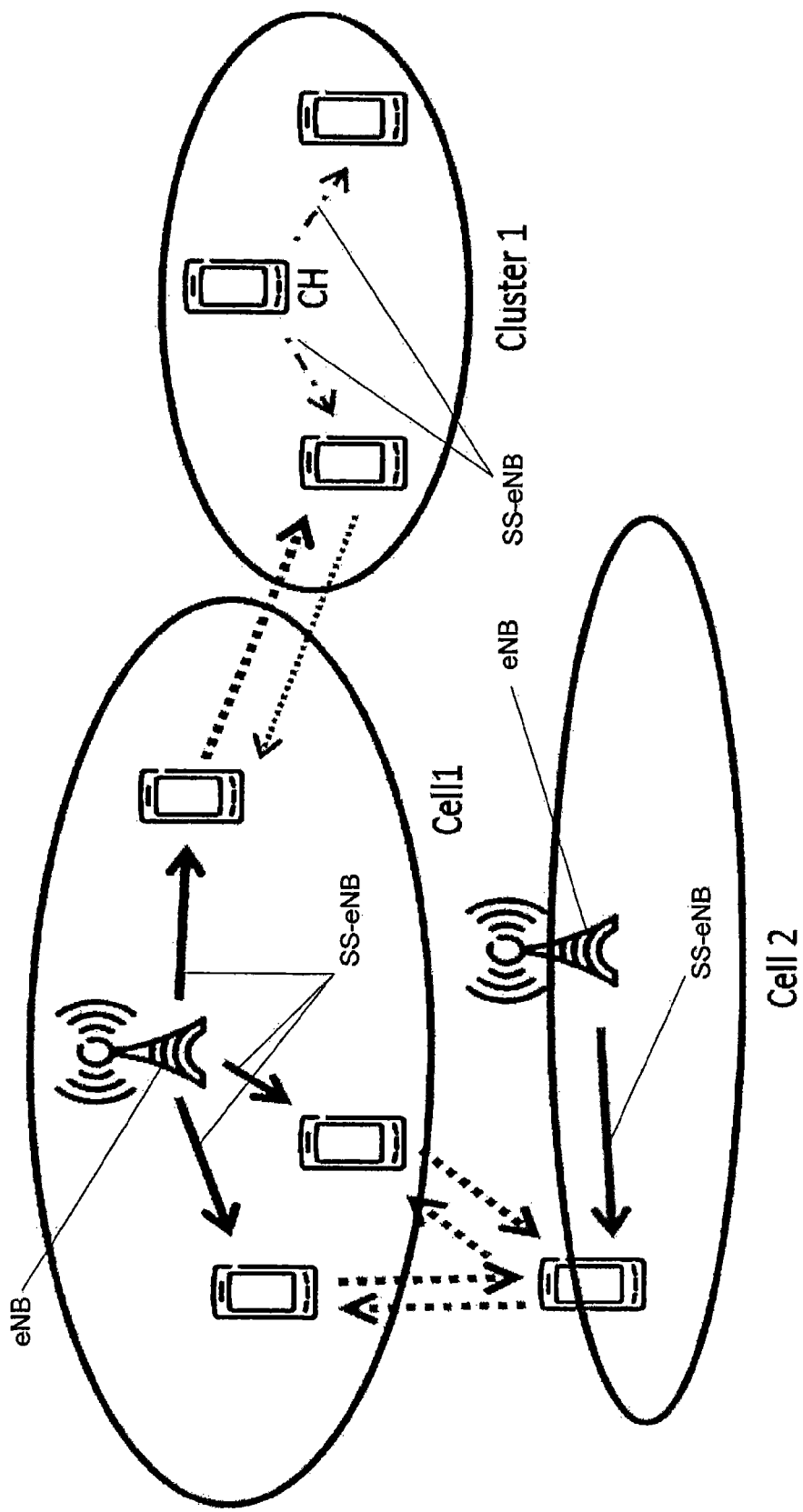
FIG. 1 schematically illustrates synchronization signals in a D2D system: eNBs (continuous lines), CHs (dot-dash) and ProSe UEs (dotted)
Figure 2:
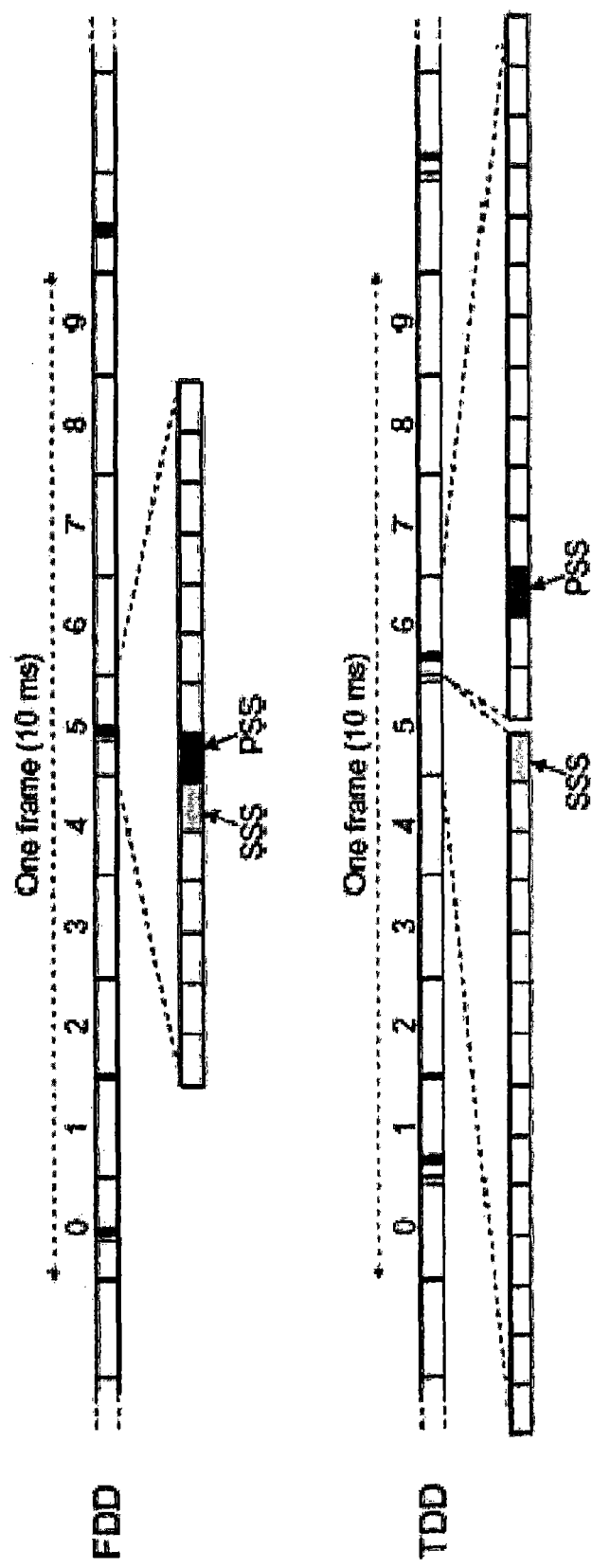
FIG. 2 illustrates time-domain position of PSS/SSS for TDD (Time Division Duplex) and FDD (Frequency Division Duplex)

There are 504 different physical-layer cell identities defined for LTE, where each cell identity corresponds to one specific downlink reference-signal sequence. The set of physical-layer cell identities is further divided into 168 cell-identity groups, with three cell identities within each group. To assist the cell search, two special signals are transmitted on each downlink component carrier, the Primary Synchronization Signal (PSS) and the Secondary Synchronization Signal (SSS). FIG. 2 shows the time-domain position of PSS/SSS for TDD (time division duplex) and FDD (frequency division duplex).

Figure 3:
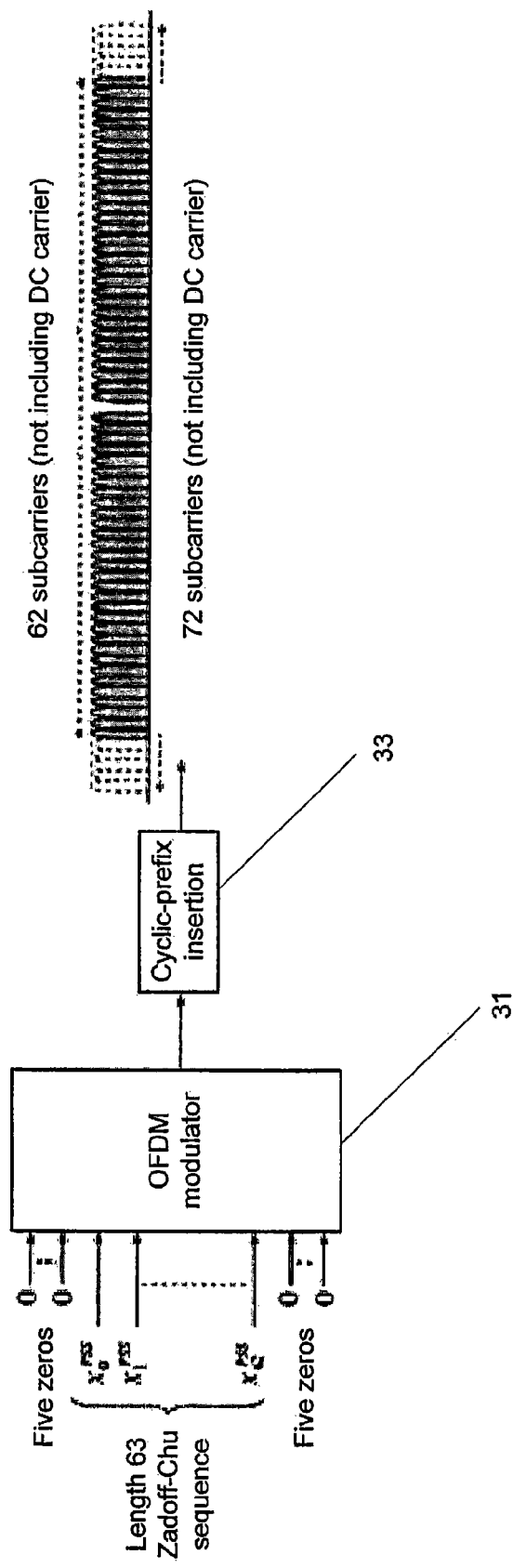
FIG. 3 illustrates an example of a Primary Synchronization Signal (PSS) structure.

The three PSSs are three length-63 Zadoff-Chu (ZC) sequences extended with five zeros at the edges and mapped to the center 73 subcarriers (center six resource blocks) using QFDM modulator 31 and cyclic prefix insertion 33 as illustrated in FIG. 3. It should be noted though that the center subcarrier is actually not transmitted as it coincides with the DC subcarrier. Thus, only 62 elements of the length-63 ZC sequences are actually transmitted.

Similar to PSS, the SSS occupies the center 72 resource elements (not including the DC carrier) in subframes 0 and 5 (for both FDD and TDD). The SSS should be designed so that:

The two SSS (SSS1 in subframe 0 and SSS2 in subframe 5) take their values from sets of 168 possible values corresponding to the 168 different cell-identity groups; and The set of values applicable for SSS2 is different from the set of values applicable for SSS1 to allow for frame-timing detection from the reception of a single SSS.

Figure 4:
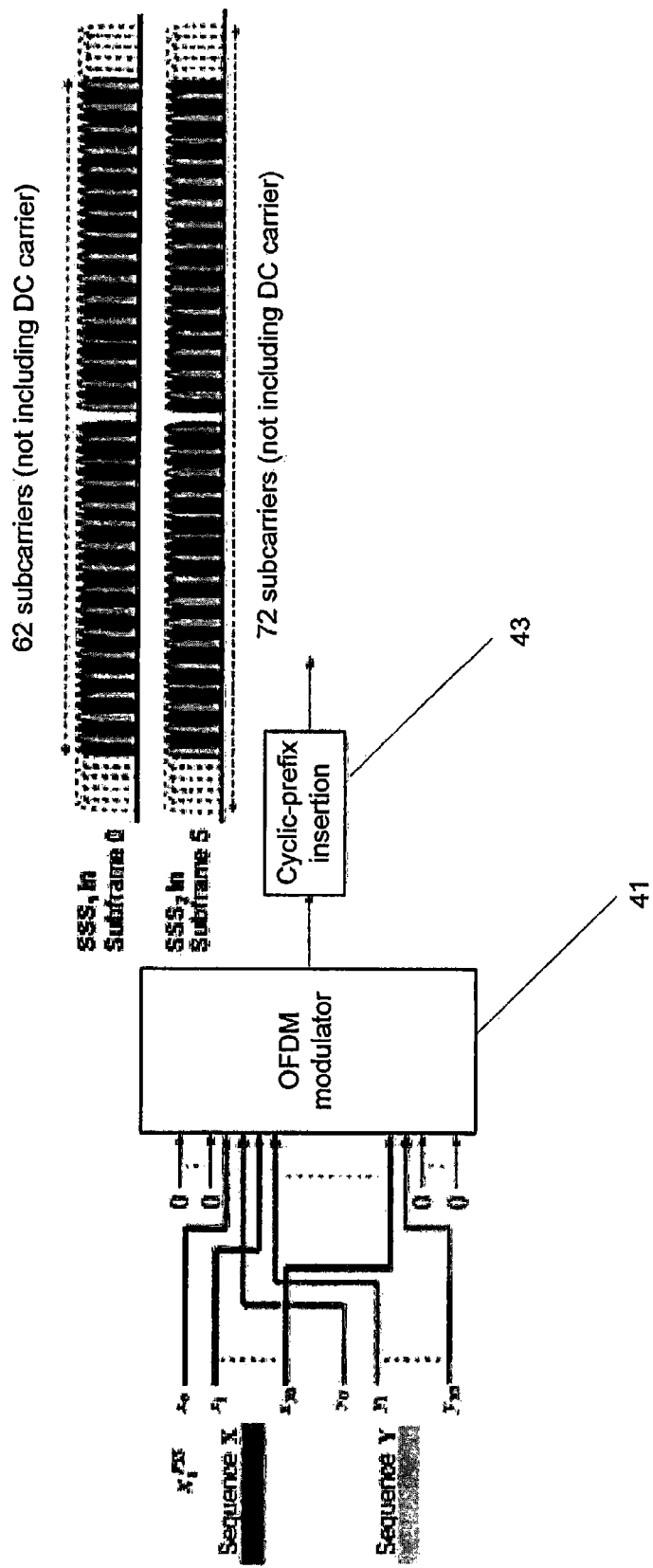
FIG. 4 illustrates an example of a Secondary Synchronization Signal (SSS) structure.

The structure of the two SSS generated using OFDM modulator 41 and cyclic-prefix insertion 43 is illustrated in FIG. 4. SSS1 is based on the frequency interleaving of two length-31 m-sequences X and Y, each of which can take 31 different values (actually 31 different shifts of the same m-sequence). Within a cell, SSS2 is based on exactly the same two sequences as SSS1. However, the two sequences have been swapped in the frequency domain, as outlined in FIG. 4. The set of valid combinations of X and Y for SSS 1 has then been selected so that a swapping of the two sequences in the frequency domain is not a valid combination for SSS1. Thus, the above requirements are fulfilled:

The set of valid combinations of X and Y for SSS1 (as well as for SSS2) are 168, allowing for detection of the physical-layer cell identity; and As the sequences X and Y are swapped between SSS1 and SSS2, frame timing can be found.

In the following discussion, we refer respectively to D2DSS_d as the D2DSS signals used in order to assist at least D2D discovery. Similarly, D2DSS_c are the D2DSS signals used in order to assist at least D2D communication. In some embodiments, two different sets of UEs transmit D2DSS_c and D2DSS_d in a system (e.g., within a cell). The above sets of UEs may be at least partly overlapping, e.g., in some cases, UEs participate in both discovery and communication. The fact that a UE participating in discovery and/or communication may be exempted from D2DSS transmission and/or reception under certain conditions is not precluded by these embodiments, but it is not discussed further. These embodiments do not preclude and can be extended to support additional/different sets of D2DSS other than D2DSS_c and D2DSS_d. For example, multiple D2DSS sets can be defined for different discovery services (type-1 discovery, type-2 discovery) or different communication services. In another example, different D2DSS sets are used for different synchronization protocols, where one protocol is only suitable for in-NW-coverage operation while another protocol is suitable even for out-of-coverage or public safety operations. The sets described here may be applied also to PD2DSCH (Physical D2D Synchronization Channel).

First embodiments may also include associating different sets of D2DSS physical layer parameters to D2DSS_d and D2DSS_c, respectively, in such a way that a receiver may efficiently distinguish between the two sets when a D2DSS is detected. This may be particularly important for UEs that are searching for a suitable D2DSS and for UEs performing measurements on D2DSS (e.g., power measurements according to a synchronization or mobility protocol). The differentiation between D2DSS_c and D2DSS_d can be obtained in many ways. In some embodiments, different D2DSS sequences are associated to D2DSS_c and D2DSS_d. In other embodiments, different D2DSS mappings in the frequency domain are associated to D2DSS_c and D2DSS_d. Considering that D2DSS comprises a set of synchronization symbols (e.g., 2 PD2DSS and 2 SD2DSS), in further embodiments, different time mappings of the symbols belonging to a D2DSS are associated to D2DSS_c and D2DSS_d. For example, the relative distance and/or position of the symbols belonging to the same D2DSS is different for D2DSS_c and D2DSS_d. In further embodiments, different Synchronization Identities (which are indicated at least partly by D2DSS) are associated to D2DSS_c and D2DSS_d.

The above embodiments focus on D2DSS only. However, at least in some cases, a synchronization physical channel (PD2DSCH) may be associated to a D2DSS in order to provide additional control information useful for synchronization. In some further embodiments different sets of PD2DSCH are defined (PD2DSCH_d and PD2DSCH_c) for discovery and communication. PD2DSCH_d and PD2DSCH_c may be distinguished by any of their physical layer parameters such as, e.g., physical layer scrambling initialization, CRC scrambling, reference signal sequences or encoding or spreading or shifting, frequency domain mapping, etc. In other embodiments, the payload of PD2DSCH may provide information on whether the associated synchronization reference or D2DSS are associated to discovery and/or communication. In some embodiments, only D2DSS_c is associated to a PD2DSCH, enabling a UE to differentiate between D2DSS_c and D2DSS_d based on detection or not of an associated PD2DSCH.

The association of any of the above properties to D2DSS_c and D2DSS_d (or equivalently PD2DSCH_c and PD2DSCH_d) can be based on a specification or it can be signaled or (pre)configured by a network controller node (e.g., eNB) in any way, including RRC signaling.

A transmitting UE transmits either D2DSS_c, or D2DSS_d or both based at least on its interest in participating in discovery and/or communication. Additional rules may apply (possibly according to eNB signaling) to determine which UEs transmit which D2DSS sets.

A receiving UE searches and tracks either D2DSS_c, or D2DSS_d or both based at least on its interest in participating in discovery and/or communication. Additional rules may apply (possibly according to eNB signaling) to determine which UEs receive which D2DSS sets.

In one example, a receiver that monitors both D2DSS_c and D2DSS_d associated to the same synchronization identity may assume that such signals are received with certain common large scale channel properties. This enables implementation advantages and performance improvement at the receiver. For example, a receiver may assume that channels associated to D2DSS_c and D2DSS_d which are in turn associated to the same synchronization identity have the same Doppler shift and the same average delay.

A receiver performing measurements on D2DSS (e.g., for the purpose of mobility or a synchronization protocol) should restrict the set of D2DSS signals used for measurement to D2DSS_c or D2DSS_d. For example, measurements for the out of coverage synchronization protocols should be only performed on D2DSS_c even if some D2DSS_d is detected by a UE. The reason is that at least in Rel-12 only D2D communication is supported for out of coverage.

Figure 8:
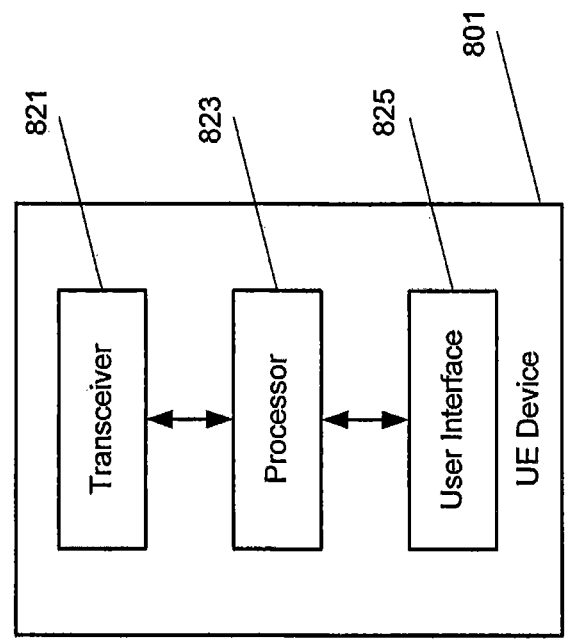
FIG. 8 is a block diagram illustrating a UE device according to some embodiments of present inventive concepts.

FIG. 8 is a block diagram illustrating a D2D UE device 801 (also referred to as a UE device, a UE, a D2D transmitter, and/or a D2D receiver) according to some embodiments of present inventive concepts. As shown, UE device 801 may include a processor 823 coupled between a transceiver 821 and a user interface 823. Transceiver 821 may include a receiver configured to receive wireless communications from a base station eNB and/or another D2D UE device, and a transmitter configured to transmit wireless communications to a base station eNB and/or another D2D UE device. User interface 825 may be configured to accept user input (via a keypad, a touch sensitive display, button/buttons, microphone, etc.) and/or provide user output (e.g., via a display, a speaker, etc.). Processor 823 may be configured to process/transmit wireless communications through transceiver 821 responsive to user input through user interface 825, and/or to receive/process wireless communications for output through user interface 825 responsive to wireless communications received through transceiver 821.

According to some embodiments of inventive concepts illustrated in flow chart of FIG. 5A, UE device 801 may act as a D2D transmitter, and UE device 801 may distinguish between different D2D synchronization signals. At block 100, processor 823 may transmit a device to device synchronization signal (D2DSS) for a first service through transceiver 821 to a D2D receiver. At block 102, processor may associate a set of D2DSS physical layer parameters to the D2DSS for the first service such that the D2DSS for the first service is distinguishable from another D2DSS for a second service. More particularly, a second set of D2DSS physical layer parameters may be associated to the D2DSS for the second service so that the D2DSS for the first service is distinguishable from the D2DSS for the second service. For example, the D2DSS for the first service may be a D2DSS for discovery support (D2DSS_d), and the D2DSS for the second service may be a D2DSS for communication support (D2DSS_c).

The D2DSS for the first service may be transmitted to enable D2D operation in support of the first service, and the D2DSS for the second service may be configured to enable D2D operation in support of the second service.

Associating a set of D2DSS physical layer parameters to the D2DSS at block 102 may include: associating different D2D sequences to the D2DSS_d and to the D2DSS_c; associating different D2DSS mappings in the frequency domain to the D2DSS_d and to the D2DSS_c; associating different D2DSS time mappings of the symbols to the D2DSS_d and to the D2DSS_c; and/or associating different synchronization identities to the D2DSS_d and to the D2DSS_c.

At block 104, processor 823 may associate a physical D2D synchronization channel (PD2DSCH) to the D2DSS for the first service such that the D2DSS for the first service is distinguishable from the D2DSS for the second service. The PD2DSCH associated to the D2DSS for the first service may be a physical D2D synchronization channel for discovery (PD2DSCH_d), and a physical D2D synchronization channel for communication (PD2DSCH_c) may be associated to the D2DSS for the second service.

According to some embodiments of FIG. 5B, transmitting the D2DSS at block 100 may include processor 823 transmitting through transceiver 821 a first D2DSS that is a D2DSS for the first service (e.g., discovery support), and operations of blocks 100, 102, and 104 may otherwise be substantially the same as discussed above with respect to FIG. 5A. At block 106, processor 823 may transmit through transceiver 821 a second D2DSS that is a D2DSS for the second service (e.g., communication support) to a D2D receiver such that the first D2DSS that is a D2DSS for the first service (e.g., discovery support) is distinguishable from the second D2DSS that is a D2DSS for the second service (e.g., communication support). The first and second D2DSSs may have: different mappings in the frequency domain; different time mappings; different synchronization identities; and/or different D2D sequences.

According to some embodiments of FIG. 5C operations of blocks 100, 102, 104, and 106 may be substantially the same as discussed above with respect to FIGS. 5A and 5B. In addition, at block 103, processor 823 may associate a first physical D2D synchronization channel (PD2DSCH) to the first D2DSS for the first service (e.g., discovery support), and at block 107, processor 823 may associate a second physical D2D synchronization channel (PD2DSCH) to the second D2DSS for the second service (e.g., communication support).

According to some embodiments of FIG. 5D operations of blocks 100, 102, 104, and 106 may be substantially the same as discussed above with respect to FIGS. 5A and 5B. In addition, at block 121, processor 823 may provide communication through transceiver 821 with a first D2D receiver based on the first D2DSS for the first service (e.g., discovery support), and at block 123, processor 823 may provide communication through transceiver 821 with a second D2D received based on the second D2DSS for the second service (e.g., communication support).

Figure 7:
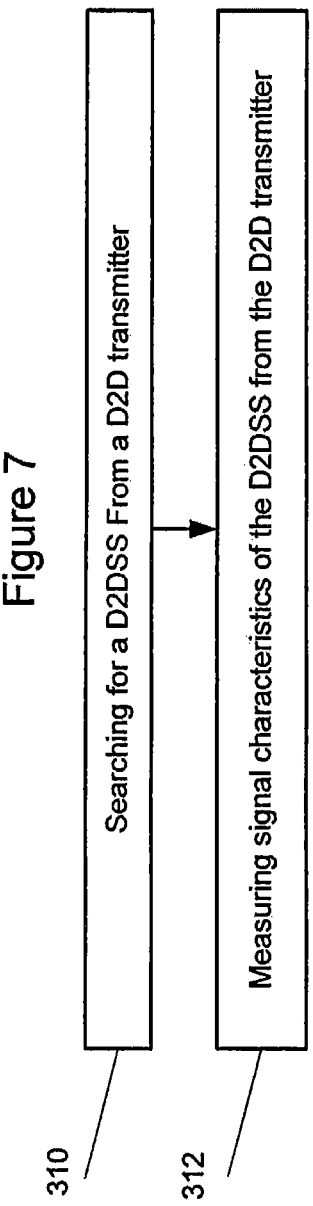

According to some embodiments of inventive concepts illustrated in the flow chart of FIGS. 6A-B and 7, UE device 801 may act as a D2D receiver, and UE device 801 may distinguish between different D2D synchronization signals. At block 200 of FIG. 6A, processor 823 may detect a D2DSS for a first service (e.g., discovery support, D2DSS_d) received through transceiver 821 from a D2D transmitter. At block 202 of FIG. 6A, processor 823 may distinguish the detected D2DSS for the first service from a D2DSS for a second service (e.g., communication support, D2DSS_c) using a first set of D2DSS physical layer parameters associated to the detected D2DSS for the first service. More particularly, a second set of D2DSS physical layer parameters may be associated to the D2DSS for the second service so that the D2DSS for the first service is distinguished from the D2DSS for the second service. processor 823 may distinguish the D2DSS from other D2DSS by distinguishing whether For example, the D2DSS for the first service may be a D2DSS for discovery support (D2DSS_d), and the D2DSS for the second service may be a D2DSS for communication support (D2DSS_c).

The D2DSS for the first service (e.g., discovery support) may be configured to enable D2D operations in support of the first service, and the D2DSS for the second service may be configured to enable D2D operation in support of the second service.

As shown in FIG. 7, detecting a D2DSS from a D2D transmitter (block 200 of FIG. 6) may further include, processor 823 searching for a D2DSS from a D2D transmitter at block 310, and measuring signal characteristics of the D2DSS from the D2D transmitter at block 312. Measuring signal characteristics of the D2DSS from the D2D transmitter may include measuring the D2D sequences and/or the D2DSS mappings in the frequency domain and/or D2DSS time mappings of the symbols and/or synchronization identities.

According to embodiments of FIG. 6B, operations of blocks 200 and 202 may be substantially the same as discussed above with respect to FIG. 6A with the D2D transmitter being a first D2D transmitter. Moreover, detecting the D2DSS at block 200 may include processor 823 detecting a first D2DSS from the first D2D transmitter that is a D2DSS for discovery support. At block 204, processor 823 may detect a second D2DSS that is a D2DSS for the second service (e.g., communication support) from a second D2D transmitter such that the first D2DSS for the first service (e.g., D2DSS for discovery support) is distinguishable from the second D2DSS for the second service (e.g., communication support). The first and second D2DSSs may have: different mappings in the frequency domain; different time mappings; different synchronization identities; and/or different D2D sequences.

According to embodiments of FIG. 6C, operations of blocks 200, 202, and 204 may be substantially the same as discussed above with respect to FIG. 6B. In addition at block 203, processor 823 may receive through transceiver 821 a first physical D2D synchronization channel (PD2DSCH) from the first D2D transmitter wherein the first physical D2D synchronization channel is associated with the first D2DSS for the first service (e.g., discovery support). At block 205, processor 823 may receive through transceiver 821 a second physical D2D synchronization channel (PD2DSCH) from the second D2D transmitter, wherein the second physical D2D synchronization channel is associated with the second D2DSS for the second service (e.g., communication support).

According to embodiments of FIG. 6D, operations of blocks 200, 202, and 204 may be substantially the same as discussed above with respect to FIG. 6B. In addition, at block 207, processor 823 may provide communication through transceiver 821 with the first D2D transmitter based on the first D2DSS for the first service (e.g., discovery support), and at block 209, processor 823 may provide communication through transceiver 821 with the second D2D transmitter based on the second D2DSS for the second service (e.g., communication support).

Example Embodiments

Embodiment 1. A method for a D2D transmitter for distinguishing between different D2D synchronization signals, D2DSSs, the method comprising: transmitting (100) a D2DSS to a D2D receiver; and associating (102) a set of D2DSS physical layer parameters to the D2DSS such that the D2DSS is distinguishable from other D2DSS.

Embodiment 2: The method of Embodiment 1, wherein associating a set of D2DSS physical layer parameters to the D2DSS such that the D2DSS is distinguishable from other D2DSS comprises associating a set of D2DSS physical layer parameters to the D2DSS such that D2DSS for discovery support, D2DSS_d is distinguishable from a D2DSS for communication support, D2DSS_c.

Embodiment 3: The method of any of Embodiments 1-2, wherein associating a set of D2DSS physical layer parameters to the D2DSS comprises associating different D2D sequences to the D2DSS_d and to the D2DSS_c.

Embodiment 4: The method of any of Embodiments 1-3, wherein associating a set of D2DSS physical layer parameters to the D2DSS comprises associating different D2DSS mappings in the frequency domain to the D2DSS_d and to the D2DSS_c.

Embodiment 5: The method of any of Embodiments 1-4, wherein associating a set of D2DSS physical layer parameters to the D2DSS comprises associating different D2DSS time mappings of the symbols to the D2DSS_d and to the D2DSS_c.

Embodiment 6: The method of any of Embodiments 1-5, wherein associating a set of D2DSS physical layer parameters to the D2DSS comprises associating different synchronization identities to the D2DSS_d and to the D2DSS_c.

Embodiment 7: The method of any of Embodiments 1-6, further comprising: associating (104) a physical D2D synchronization channel, PD2DSCH, to the D2DSS such that the D2DSS is distinguishable from other D2DSS.

Embodiment 8: The method of Embodiment 7, wherein PD2DSCH further comprises physical D2D synchronization channel for discovery, PD2DSCH_d, and physical D2D synchronization channel for communication, PD2DSCH_c.

Embodiment 9. A method for a D2D receiver for distinguishing between different D2D synchronization signals, D2DSSs, the method comprising: detecting (106) a D2DSS from a D2D transmitter; and distinguishing (108) the detected D2DSS from other D2DSS, using a set of D2DSS physical layer parameters associated to the detected D2DSS.

Embodiment 10: The method of Embodiment 9, wherein detecting a D2DSS from a D2D transmitter further comprises: searching (110) for a D2DSS from a D2D transmitter; and measuring (112) signal characteristics of the D2DSS from the D2D transmitter.

Embodiment 11: The method of any of Embodiments 9-10, wherein measuring signal characteristics of the D2DSS from the D2D transmitter comprises measuring the D2D sequences and/or the D2DSS mappings in the frequency domain and/or D2DSS time mappings of the symbols and/or synchronization identities.

Embodiment 12: The method of any of Embodiments 9-11, wherein distinguishing the D2DSS from other D2DSS comprises distinguishing whether the D2DSS is a D2DSS for discovery support, D2DSS_d or whether the D2DSS is a D2DSS for communication support, D2DSS_c.

ABBREVIATIONS

D2D device to device
SS synchronization signal
PSS primary synchronization signal
SSS secondary synchronization signal
D2DSS device to device synchronization signal
PD2DSS primary D2DSS
SD2DSS secondary D2DSS
PD2DSCH Physical D2D synchronization channel
ZC Zadoff chu
DC direct current
FDD frequency division duplex
TDD time division duplex
CH cluster head
IC in coverage
OOC out of coverage
PAPR peak to average power ratio
RS reference signal
NW Network

FURTHER DEFINITIONS AND EMBODIMENTS

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but do not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following claims and their equivalents, and shall not be restricted or limited by the foregoing detailed description.

That which is claimed is:

1. A method for a device to device, D2D, receiver for distinguishing between different D2D synchronization signals (D2DSS), the method comprising:
   detecting a D2DSS for a first service from a D2D transmitter; and
   distinguishing the detected D2DSS for the first service from a D2DSS for a second service using a first set of D2DSS physical layer parameters associated to the detected D2DSS for the first service, wherein a second set of D2DSS physical layer parameters are associated to the D2DSS for the second service so that the D2DSS for the first service is distinguished from the D2DSS for the second service.

2. The method of claim 1, wherein the D2DSS for the first service is a D2DSS for discovery support (D2DSS_d) so that the first set of D2DSS physical layer parameters are associated to the D2DSS for discovery support (D2DSS d), and wherein the D2DSS for the second service is a D2DSS for communication support (D2DSS_c) so that the second set of D2DSS physical layer parameters are associated to the D2DSS for communication support (D2DSS_c).

3. The method of claim 2, wherein detecting a D2DSS from a D2D transmitter further comprises:
   searching for a D2DSS from a D2D transmitter; and
   measuring signal characteristics of the D2DSS from the D2D transmitter.

4. The method of claims 3, wherein measuring signal characteristics of the D2DSS from the D2D transmitter comprises measuring D2D sequences and/or D2DSS mappings in the frequency domain and/or D2DSS time mappings of symbols and/or synchronization identities.

5. The method of claim 4, wherein the D2D transmitter is a first D2D transmitter, and wherein detecting the D2DSS for the first service comprises detecting a first D2DSS from the first D2D transmitter that is a D2DSS for the first service, the method further comprising:
   detecting a second D2DSS that is a D2DSS for the second service from a second D2D transmitter such that the first D2DSS for the first service is distinguishable from the second D2DSS for the second service.

6. The method of claim 5 wherein the first and second D2DSSs have different mappings in the frequency domain.

7. The method of claim 5, wherein the first and second D2DSSs have different time mappings.

8. The method of claim 2, wherein the D2D transmitter is a first D2D transmitter, and wherein detecting the D2DSS for the first service comprises detecting a first D2DSS from the first D2D transmitter that is a D2DSS for the first service, the method further comprising:
   detecting a second D2DSS that is a D2DSS for the second service from a second D2D transmitter such that the first D2DSS for the first service is distinguishable from the second D2DSS for the second service.

9. The method of claim 8, wherein the first and second D2DSSs have different mappings in the frequency domain.

10. The method of claim 8, wherein the first and second D2DSSs have different time mappings.

11. The method of claim 8, wherein the first and second D2DSSs have different synchronization identities.

12. The method of claim 8, wherein the first and second D2DSSs have different D2D sequences.

13. The method of claims 8, further comprising:
providing communication with the first D2D transmitter based on the first D2DSS for the first service; and
providing communication with the second D2D transmitter based on the second D2DSS for the second service.

14. A device to device (D2D) receiver comprising:
a processor configured to detect a D2D synchronization signal (D2DSS) for a first service from a D2D transmitter, and to distinguish the detected D2DSS for the first service from a D2DSS for a second service, using a first set of D2DSS physical layer parameters associated to the detected D2DSS for the first service, wherein a second set of D2DSS parameters are associated to the D2DSS for the second service so that the D2DSS for the first service is distinguished from the D2DSS for the second service.

15. The D2D receiver of claim 14, wherein the D2DSS for the first service is a D2DSS for discovery support (D2DSS_d) so that the first set of D2DSS physical layer parameters are associated to the D2DSS for discovery support (D2DSS_d), and wherein the D2DSS for the second service is a D2DSS for communication support (D2DSS_c) so that the second set of D2DSS physical layer parameters are associated to the D2DSS for communication support (D2DSS_c).

16. The D2D receiver of claim 14, wherein the processor is further configured to detect a D2DSS from a D2D transmitter by searching for a D2DSS from a D2D transmitter, and measuring signal characteristics of the D2DSS from the D2D transmitter.

17. The D2D receiver of claim 16, wherein measuring signal characteristics of the D2DSS from the D2D transmitter comprises measuring D2D sequences and/or D2DSS mappings in the frequency domain and/or D2DSS time mappings of symbols and/or synchronization identities.

18. The D2D receiver of claim 17, wherein the D2D transmitter is a first D2D transmitter, wherein detecting the D2DSS for the first service comprises detecting a first D2DSS from the first D2D transmitter that is a D2DSS for the first service, and wherein the processor is further configured to detect a second D2DSS that is a D2DSS for the second service from a second D2D transmitter such that the first D2DSS for the first service is distinguishable from the second D2DSS for the second service.

19. The D2D receiver of claim 18 wherein the first and second D2DSSs have different mappings in the frequency domain.

20. The D2D receiver of claim 18, wherein the first and second D2DSSs have different time mappings.

21. The D2D receiver of claim 14, wherein the D2D transmitter is a first D2D transmitter, wherein detecting the D2DSS for the first service comprises detecting a first D2DSS from the first D2D transmitter that is a D2DSS for the first service, and wherein the processor is further configured to detect a second D2DSS that is a D2DSS for the second service from a second D2D transmitter such that the first D2DSS for the first service is distinguishable from the second D2DSS for the second service.

22. The D2D receiver of claim 21 wherein the first and second D2DSSs have different mappings in the frequency domain.

23. The D2D receiver of claim 21, wherein the first and second D2DSSs have different time mappings.

24. The D2D receiver of claim 21, wherein the first and second D2DSSs have different synchronization identities.

25. The D2D receiver of claim 21, wherein the first and second D2DSSs have different D2D sequences.

26. The D2D receiver of claims 21, wherein the processor is further configured to provide communication with the first D2D transmitter based on the first D2DSS for the first service; and provide communication with the second D2D transmitter based on the second D2DSS for the second service.

* * * * *